(No Model.)
M. WANNER.
REFRIGERATING APPARATUS.
No. 500,107. Patented June 20, 1893.
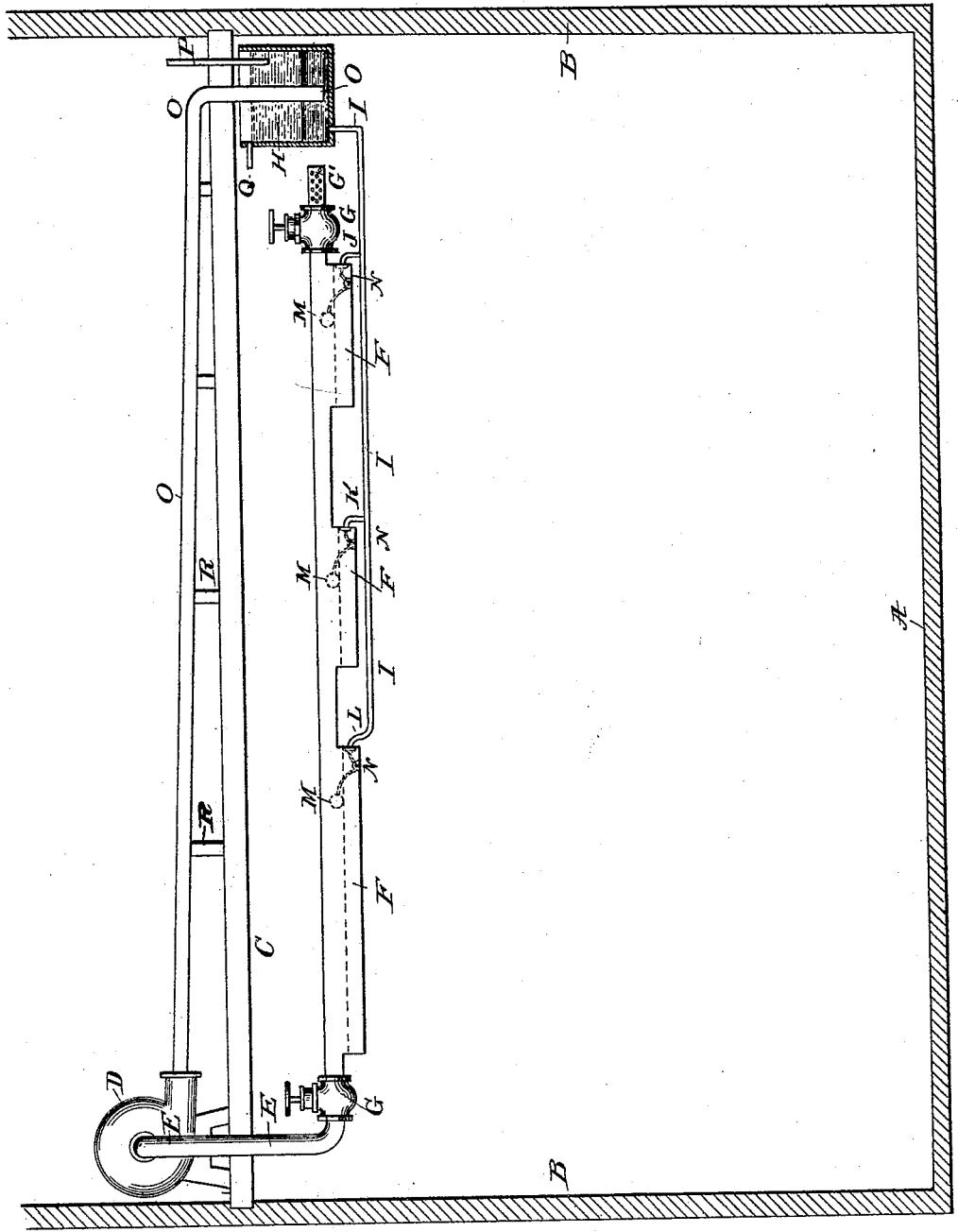
WITNESSES:
Edward C. Rowland.
John E. Lacey
INVENTOR
Martin Wanner
BY Phillips Abbott
ATTORNEY

UNITED STATES PATENT OFFICE.

MARTIN WANNER, OF DENVER, COLORADO, ASSIGNOR OF ONE-HALF TO WILLIAM B. CRITTENDEN AND JOHN M. MILLMAN, OF BUCYRUS, OHIO.

REFRIGERATING APPARATUS.

SPECIFICATION forming part of Letters Patent No. 500,107, dated June 20, 1893.

Application filed December 8, 1892. Serial No. 454,458. (No model.)

*To all whom it may concern:*

Be it known that I, MARTIN WANNER, a citizen of the United States, and a resident of Denver, in the county of Arapahoe and State of Colorado, have invented certain new and useful Improvements in Refrigerating Apparatus, of which the following is a specification.

My invention relates to an improved refrigerating apparatus. It is specially applicable to the refrigeration of cold warehouses, and to the refrigeration of compartments in vessels, abattoirs, breweries and the like places, and it is also applicable to the manufacture of artificial ice. In my apparatus I employ carbon bi-sulphide, in somewhat the same manner that ammonia is now used, that is to say, the carbon bi-sulphide is caused to evaporate rapidly, thus producing the cold. There are, however, certain important differences between the use of ammonia in any form, and the use of carbon bi-sulphide, whereby I am enabled to employ my novel apparatus, and by the use of this material, and my improved apparatus, I secure many marked advantages, some of which are as follows: In the use of aqua ammonia the original cost of the apparatus is so great, as practically to preclude its use, excepting under unusually favorable conditions. Consequently in the large majority of refrigerating plants now in operation the an-hydrous ammonia is employed, in the use of which, however, there are also very grave objections; among them is the first cost of the plant, the same as in the case of aqua ammonia, and in addition to this, the great difficulty of confining the an-hydrous ammonia during transportation and during use in the plant; the cost of the an-hydrous ammonia itself, the cost of the tanks to contain it in transportation, the transportation charges owing to the weight of the tanks, the liability to accident consequent upon bursting of the tanks, the very heavy repair account of the plant resulting from the necessity for confining the material under heavy pressure and also the expense in addition to those already suggested necessitated by the re-compression of an-hydrous ammonia for re-use. By the employment of my novel apparatus, I overcome many of the objections recited above altogether and others I measurably reduce; and my apparatus is so constructed that after it is once set up and charged, its running expenses are exceedingly small for all that is required being sufficient power to run an exhaust fan or pump and the cost of a small percentage of the material, carbon bi-sulphide, which may become lost through wastage.

Generally stated, my invention is as follows: I employ as the refrigerating medium carbon bi-sulphide and it is owing to the peculiar properties of this very volatile substance that I am enabled to employ my novel apparatus whereby I secure the results above suggested and the advantages claimed. These properties are as follows:—first, its volatility combined with its low "critical" pressure, *i. e.*, the pressure at which it will reliquefy, after having been in a condition of vapor, in other words, evaporated; this pressure, in the case of carbon bi-sulphide, being only about fifteen pounds to the square inch, *i. e.*, about atmospheric pressure, as compared to a pressure of one hundred and twenty pounds to the square inch necessary for reliquefaction of anhydrous ammonia.

Other advantages *i., e.*, cheapness of the plant, low running expenses, &c., I secure by a very simple form of apparatus in which I employ the carbon bi-sulphide, the more important features whereof are a reservoir to contain the carbon bi-sulphide, a pipe to convey the same to evaporating pans or devices, a fan or blower to cause air drafts over the surface of the carbon bi-sulphide in the evaporators and a return trunk from the fan to the reservoir to convey the vapors and condensed carbon bi-sulphide back again to the source of supply.

The drawing hereof illustrates a vertical section of what may be assumed to be the refrigerator room in an abattoir.

A is the floor; B, B, the sides; C the ceiling or floor above.

D is an ordinary suction fan.

E is a pipe or trunk preferably of metal, which connects with the eye of the pan as shown and is enlarged at places by depressed or pan like parts, F, F, F. I show them of different sizes because it will sometimes be desirable to make them larger in certain parts of the apartment or space to be refrigerated than at other parts. The pipe E, and these pans F, F, F are suitably supported upon the walls or from the ceiling or floor of the apartment in any suitable manner.

G, G are valves set in the pipe E, and at its end the pipe has a strainer or is provided with perforations G' so that the air may freely enter but obstructions to the apparatus will be prevented from being drawn in.

H is a tank or reservoir. I is a small pipe connecting with it at or near its bottom, provided with branch pipes J, K, and L which respectively enter the pans F, as shown, and each of them is provided with a float valve pivoted at N to the pan or other suitable support which controls and stops the inflow of the carbon bi-sulphide when the desired depth or amount of it is in each pan. Thus the right quantity is permanently maintained in each pan so long as there is any in the reservoir H. O is a return pipe or trunk which connects the delivery port of this pan with the lower interior part of the reservoir. It is set on a descent during its passage through the second floor room or space, so that such of the vapors of the carbon bi-sulphide as condense before reaching the reservoir will flow down it to the reservoir.

P is a pipe connecting with any suitable source of water supply and Q is an overflow pipe for the reservoir which may for convenience connect with a sewer or other point of discharge.

R, R, are supports for the trunk O. It may be supported in any other suitable manner. There is a constant running stream of water flowing into and out of the reservoir H at all times. It may be a small one.

The operation of the apparatus is very simple, and is based upon the fact that carbon bi-sulphide, being an exceedingly volatile substance, will, when subjected to currents of air, evaporate with great rapidity, thus producing great cold. The valves G being both opened, the carbon bi-sulphide is first poured into the reservoir through its open top, until all of the pans F have been filled up to the normal level as shown by the dotted lines. Then the reservoir is filled about half full by additionally pouring the material into it. Then water is allowed to enter the reservoir through the pipe P, which floating on the carbon bi-sulphide (which has greater specific gravity than it) soon fills up the reservoir and overflows at A. Thereupon the fan, which of course is a suction fan is started and it generates a current of air more or less rapid depending upon the degree of cold desired, to pass through the pipe or trunk E entering it at the evaporated end G. This current of air coming in contact with the surface of the carbon bi-sulphide in the pans F rapidly evaporates it. The vapors pass up through the trunk E, enter the eye of the fan and are delivered into the return duct O in which they may commence to condense again if the temperature be sufficiently low. If so they flow along through the trunk O back again to the reservoir and are delivered there below the water which is superposed upon it, as shown by dotted lines. If there is no condensation in the trunk O then the vapors or such of them as do not condense are delivered into the reservoir together with the air and rise through the superposed body of water in the form of bubbles. During the passage of these bubbles composed of air and carbon bi-sulphide vapor through the water the temperature of which will be so far below 108° Fahrenheit at about which temperature the carbon bisulphide begins to condense as to secure its rapid condensation and consequently, the carbon bi-sulphide leaves the air and reliquefies, falling to the bottom of the reservoir below the water, the air meantime escaping from the surface of the water in the reservoir, in the form of bubbles. It will thus be seen that the process is continuous, the reservoir being constantly supplied with the reliquefied or condensed carbon bi-sulphide, which is in turn again conveyed to the pans, F.

It will be understood that where there are a number of floors in a building, as for instance a cold storage warehouse, requiring refrigeration there should be appliances such as described or their equivalents on each floor, or that the cold generated in one space, room or floor should be conveyed to the others.

I do not limit myself to the details of construction shown and described because it will be apparent to those who are familiar with this art that many modifications may be made in them and still the invention be employed, and particularly the enlarged portions F of the pipe E, need not be employed, because the pipe itself, if large enough to contain the carbon bi-sulphide in its lower section and allow space for the air currents over it, will answer very well. I show the form of apparatus described simply as one form in which my process may be practiced.

It is also obvious that my invention both as to process and apparatus or a modified construction of the latter is well adapted to the manufacture of artificial ice. That is to say, sets or groups of the pans F or pipes E, or other devices suitable for the purpose may be placed within the brine tank in which the vessels containing the water to be frozen will be submerged in the ordinary way, the end of the pipe E, through which the air is drawn, being of course outside of the brine tank. In such a use of my invention, the apparatus should be adapted to very rapid evaporation of the carbon bi-sulphide, to generate a great degree of cold.

It will be observed that the carbon bi-sulphide is sealed against atmospheric contact and consequently evaporation while in the reservoir by the superposed body of water which is constantly maintained by the supply pipe P. And it will also be observed that the bottom of the reservoir is not below the normal surface of the carbon bi-sulphide in the pans or pipe F. Consequently they will always be supplied with material by gravity.

It will also be observed that in my process and apparatus I employ a constantly renewed current of fresh air obtained from the surrounding atmosphere and not as in many other apparatus, attempting to use the same air over and over again. Thus I secure always fresh air and am relieved of the expense of building an air tight apparatus; moreover I wish exposure to the atmosphere that I may avail myself of the atmospheric pressure to aid in the condensation, i. e., to supply pressure the cold water supplying the low temperature. Also the continually renewed water not only supplies the low temperature for the condensation, but if the water column be high enough, the air will be thoroughly washed of carbon bi-sulphide and practically none will escape in the air bubbles. Moreover the height of the water column can be regulated to give such pressure on the returned carbon bi-sulphide vapors as may be necessary or desired to facilitate their condensation, and the volatile liquid being of greater specific gravity than water and insoluble in it, is sealed by it. I employ the valves in the pipe E, so that when the apparatus is not in operation they may be closed and the carbon bi-sulphide in them prevented from evaporating and being wasted.

I claim—

1. The combination in a refrigerating apparatus of a reservoir adapted to contain the refrigerating material, a receptacle for the said material, connected with the reservoir in which receptacle the material may be exposed to the action of a current of air, a pipe open to the exterior atmosphere and connecting said receptacle with the device which produces the current of air, and said device, substantially as set forth.

2. The combination in a refrigerating apparatus of a reservoir adapted to contain the refrigerating material, a receptacle for the said material, connected with the reservoir, and in which the material may be exposed to the action of a current of air, a pipe open to the exterior atmosphere and connecting said receptacle with the device which creates the current of air, said device and pipe being constructed and arranged to draw the vapors from said receptacle and confine the same, substantially as set forth.

3. The combination in a refrigerating apparatus of a reservoir adapted to contain the refrigerating material, a receptacle for said material, connected with the reservoir, and in which the material may be exposed to the action of a current of air, a pipe open to the exterior atmosphere and a device to create a current of air both constructed and arranged to draw the vapors from said receptacle and confine them and a return pipe connecting the device which creates the current of air with the reservoir and means within the reservoir to condense the vapors, substantially as set forth.

4. The combination in a refrigerating apparatus of a reservoir adapted to contain the refrigerating material, a receptacle for the said material, connected with the reservoir, in which it may be subjected to a current of air, a pipe connecting said receptacle with the device which creates the current of air, said pipe being open at one end to the external atmosphere and constructed and arranged to draw the vapors from said receptacle and confine the same a return pipe connecting the device which creates the current of air with the reservoir, and means to convey running water to and from said reservoir, substantially as set forth.

Signed at New York, in the county of New York and State of New York, this 15th day of November, A. D. 1892.

MARTIN WANNER.

Witnesses:
PHILLIPS ABBOTT,
M. L. FERRES.

It is hereby certified that in Letters Patent No. 500,107, granted June 20, 1893, upon the application of Martin Wanner, of Denver, Colorado, for an improvement in "Refrigerating Apparatus," an error appears requiring correction, as follows: In the head of the printed specification it is stated that said Wanner has assigned "one half" of his right, title, and interest to William B. Crittenden and John M. Millman, of Bucyrus, Ohio, whereas it should have been stated that he had assigned *eleven-twentieths* to said parties; and that the Letters Patent should be read with this correction therein that the same may conform to the record of the case in the Patent Office.

Signed, countersigned, and sealed this 27th day of June, A. D. 1893.

[SEAL.]

JNO. M. REYNOLDS,
*Assistant Secretary of the Interior.*

Countersigned:
   S. T. FISHER,
      *Acting Commissioner of Patents.*